United States Patent [19]

Lippitsch

[11] Patent Number: 5,695,426

[45] Date of Patent: Dec. 9, 1997

[54] AUTOMOTIVE TRANSMISSION APPARATUS

[75] Inventor: Klaus Lippitsch, Graz, Austria

[73] Assignee: Steyr-Daimler-Puch Aktiengesellschaft, Wien, Austria

[21] Appl. No.: 504,325

[22] Filed: Jul. 19, 1995

[30] Foreign Application Priority Data

Aug. 3, 1994 [AT] Austria ................................. 1524/94
Sep. 27, 1994 [DE] Germany ..................... 44 34 512.7

[51] Int. Cl.⁶ .......................... B60K 17/34; B60K 23/08; F16H 48/00

[52] U.S. Cl. ................................ 475/204; 475/206

[58] Field of Search .............................. 475/204, 206

[56] References Cited

U.S. PATENT DOCUMENTS

| | | | |
|---|---|---|---|
| 2,326,752 | 8/1943 | Buckendale | 475/204 |
| 3,090,256 | 5/1963 | Hause | 475/204 |
| 3,386,314 | 6/1968 | Stockton | 475/206 |
| 3,993,152 | 11/1976 | Fogelberg | 180/44 |
| 4,817,753 | 4/1989 | Hiketa | 475/206 |

*Primary Examiner*—Dirk Wright
*Attorney, Agent, or Firm*—Karl Hormann

[57] ABSTRACT

The invention so-called torque transfer case in the housing of which there are provided a torque input shaft and, mounted at a level below, a differential gear with propeller shafts extending from opposite sides thereof in parallel relationship with the torque input shaft, the torque input shaft being drivingly connected to the differential gear assembly by a range transmission box, such as a planetary gear set, and a drive train, the drive train being connected to a sun gear of the planetary gear train, the carrier of which is connected to a differential case. A ring gear meshing with planet gears may be selectively moved into engagement with the housing or the planet carrier to shift the torque transfer case between road and range gear modes.

13 Claims, 3 Drawing Sheets

AUTOMOTIVE TRANSMISSION APPARATUS

BACKGROUND OF THE INVENTION

1. Field of the Invention

The invention, in general, relates to an automotive power transfer apparatus and, more particularly, to a power transfer mechanism of the kind conventionally known as a torque transfer case adapted to be incorporated in a multiple path drive system of a vehicle for selectively operating it in a road gear mode or a range gear mode. In the housing of the apparatus there are provided an input or drive shaft and, positioned in parallel therebelow, a pair of coaxial output or propeller shafts extending from opposite sides of a differential gear, the drive shaft being drivingly connected to the differential gear by way of a range transmission box and a drive train. Such torque transfer cases are utilized in cross-country, i.e. usually four-wheel-drive, vehicles equipped with conventional power plants such as longitudinal engine-transmission units and jointed or universal shafts connected to front and rear axles, when the position of the engine-transmission unit prevents using a propeller shaft which is both coaxial with the drive shaft of the torque transfer case and connected to the rear axle.

2. Discussion of the Prior Art

U.S. Pat. No. : 3,993,152 issued Nov. 23, 1976 to Fogelberg, discloses a power transfer mechanism the range transmission box of which comprises a parallel axial gear unit associated with an input shaft, with a belt or chain providing a drive train connecting the gear unit to propeller shafts. In more advanced developments of such known apparatus the range transmission box is a planetary gear train associated with the input shaft, and the differential gear is constituted by a bevel gear differential.

Such arrangements suffer from the disadvantage that the range transmission box is associated with the drive shaft so that, in the range gear setting, the belt is subjected to a multiple of the normal traction force or load, which mandates increased dimensions and, hence, greater weight and size and higher noise levels. An oil sump or pan is provided in the housing of the torque transfer case, but because of the downwardly directed drive train the range transmission box associated with the drive shaft is positioned substantially above the oil pan, so that additional measures are required for supplying oil to the range transmission box. Additional difficulties arise in cross-country vehicles because the supply of lubricant oil must be ensured even at extreme inclinations of the vehicles.

Where the range transmission box is a planetary gear train associated with an input shaft and provided with a permanently fixed ring gear, still further disadvantages result: In either gear setting (road gear or range gear) the planetary gear train rolls along the interior of the ring gear, causing increased wear and higher losses; moreover, lubrication and cooling are problematical.

OBJECTS OF THE INVENTION

Therefore, it is an object of the invention to provide an improved power transfer mechanism of the kind referred to which does not suffer from any the disadvantages described supra and which, at small structural dimensions and low weight, satisfies all requirements with maximum safety and minimum effort.

BRIEF SUMMARY OF THE INVENTION

Briefly, in accordance with the invention these and other objects are accomplished by a drive train driving the sun wheel of a planetary gear train arranged coaxially with propeller shafts, the planet carrier of the planetary gear train being connected to an input shaft of a differential gear and the internal or ring gear of the planetary gear train meshing with planetary gears and being selectively connectible with either the planet carrier or the housing.

Other objects will in part be obvious and will in part appear hereinafter.

BRIEF DESCRIPTION OF THE SEVERAL DRAWINGS

The novel features which are considered to be characteristic of the invention are set forth with particularity in the appended claims. The invention itself, however, in respect of its structure, construction and lay-out, as well as manufacturing techniques, together with other objects and advantages thereof, will be best understood from the following description of preferred embodiments when read in connection with the appended drawings, in which:

DETAILED DESCRIPTION OF THE SEVERAL EMBODIMENTS

Figure 1:
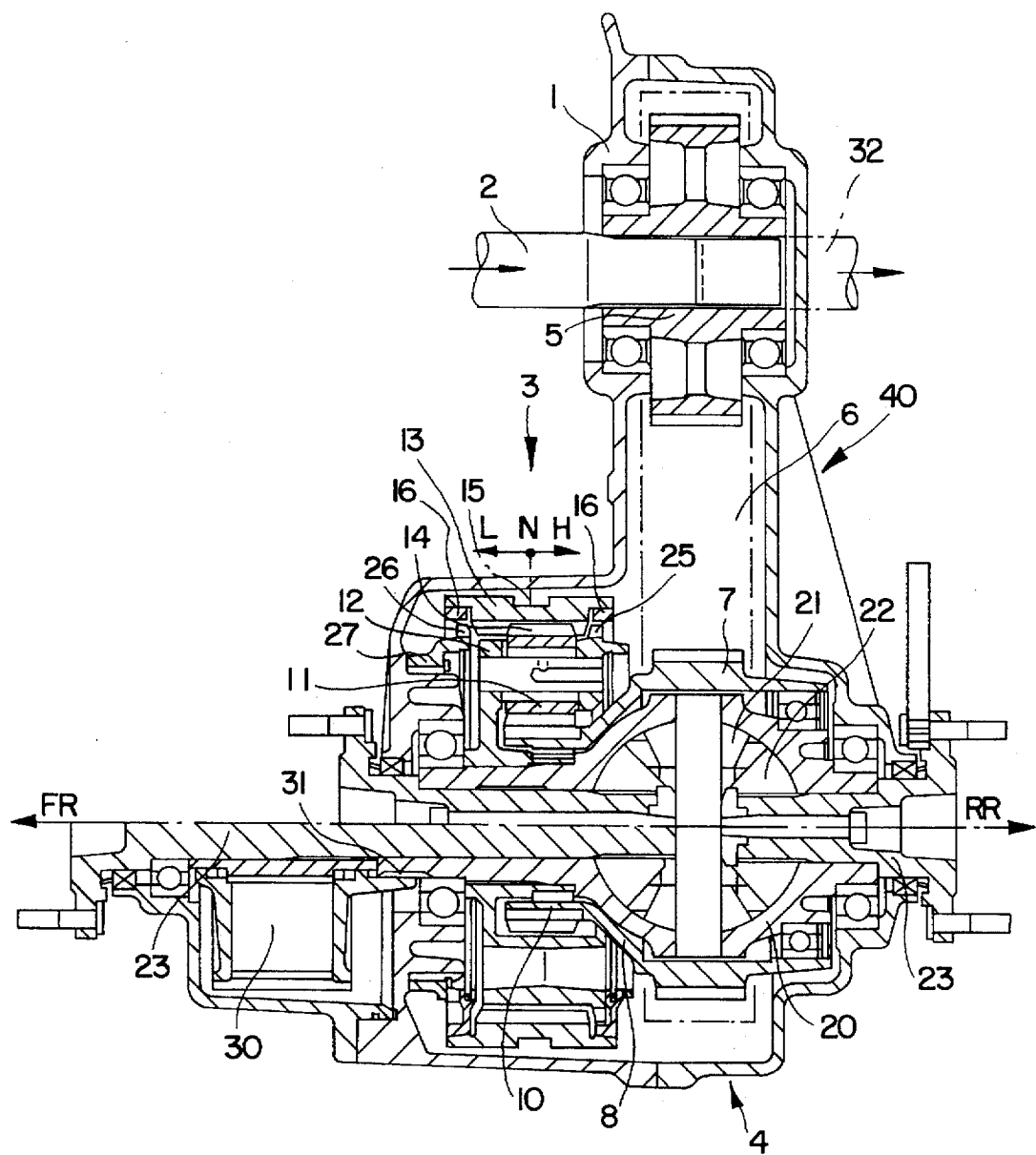
FIG. 1 is a view in vertical section of a first embodiment of a power transfer mechanism in accordance with the invention.

The power transfer mechanism, hereinafter sometimes called torque transfer case, of FIG. 1 is provided with a housing 1 within which there is provided a torque input or drive shaft 2 powered by an engine-transmission-unit (not shown), as well as a range transmission box 3 and a differential gear 4, hereinafter sometime called center differential, for driving front and rear axles (not shown but respectively indicated by letters FR and RR).

The drive torque furnished by the engine-transmission unit is transmitted by the input shaft 2 which is appropriately journalled in the housing 1, to a primary wheel 5 splined to the input shaft 2. From the primary wheel 5 the drive torque is transmitted downwardly by a belt 6 or chain to a secondary wheel 7 mounted coaxially with the center differential 4. The primary wheel 5, the belt 6 and the secondary wheel 7 constitute a downwardly directed drive train. It will be understood by those skilled in the art that the primary and secondary wheels may be pulleys, sprockets or gears, depending upon whether a belt, a chain or, as described infra, a gear is employed for the torque transmission between them. The secondary wheel 7 and the sun gear 10 of a planetary gear train 3 to be described are either integral with, or splined to, an appropriately journalled hollow shaft or sleeve 8.

The sun gear 10 is part of the range transmission box 3 which is shown to be a planetary gear train. The planetary gear train 3 comprises the sun wheel 10, a planet carrier 12 including planet gears 11 meshing with the sun gear 10, and a ring gear 13 provided with internal teeth 14 meshing with the planet gears 11. The ring gear 13 also functions as an axially movable dog clutch and is for this purpose provided with an external annular groove 15 for receiving a shift fork (not shown).

At its side facing away from the housing 1, the planet carrier 12 is additionally provided with a first set of dog teeth 25 and with a second set of dog teeth 26 on a connecting ring 27 rigidly connected to the housing 1. The dog teeth 25 and 26 are adapted selectively to be brought into engagement with opposite ends of the internal teeth of the ring gear 13. As shown, synchronizing means, such as a synchromesh cone 16, may additionally be provided to simplify the shifting operation.

The planet carrier 12 is rigidly connected, for instance by splining, to a hollow input shaft of case 20 of the differential 4. The differential case 20, by way of pinion gears 21, drives side gears 22 of the differential 4 which are connected to propeller shafts 23. The propeller shafts 23 are adapted to be connected to front and rear axles, schematically identified by letters FR and RR, respectively, of a four-wheel-drive vehicle (not shown). The differential case 20 is rotatably and coaxially journalled within the sleeve 8. The sleeve 8, at a position approximately centrically of the differential 4, comprises the secondary wheel 7 of the belt 6. The sleeve 8 is provided at one of its ends, either integral or drivingly connected therewith, with the sun wheel 10 of the planetary gear train 3.

The planetary gear train 3 of the embodiment shown in FIG. 1 is shifted in the following manner:

In the depicted shift position N the ring gear 13 is freely rotatable. Accordingly, the transmission cannot transmit any torque. If the ring gear 13, by being axially shifted to its H shift position, which corresponds to the gear mode, its internal teeth 14 will engage the first set of dog teeth 25 of the planet carrier 12. Thus, the entire planetary gear train 3 will rotate, and the secondary wheel 7 and the case 20 of the differential 4 will rotate at the same speed.

If the ring gear 13 is shifted to its L position, which corresponds to its cross-country or range gear mode, the second set of dog teeth 26 mounted stationary relative to the housing 1 will engage the internal teeth 14 of the ring gear 13. In this fashion, the ring gear 13 is prevented from rotating and the planet gears 11 roll along its internal teeth 14. The planet carrier 12 will, therefore, rotate more slowly than the sun gear 10, resulting in the step-down transmission ratio of the range gear.

The center differential 4 may in various ways be locked partially or totally, for instance, as depicted in the drawing below its center line, by a fluid friction of viscous coupling 30 mounted on one of the propeller shafts 23. The internal component of the viscous coupling 30 is driven by the propeller shaft 23, and the outer component is driven by the case 20 of the differential 4 to which it may be connected by splining 31, for instance. Fluid friction acting between the impellers (not shown) of the inner and outer portions of the viscous coupling 30 results in a partial locking of the center differential 4.

As indicated in broken lines, the input shaft 2 may be extended to form an auxiliary power take-off 32.

Figure 2:
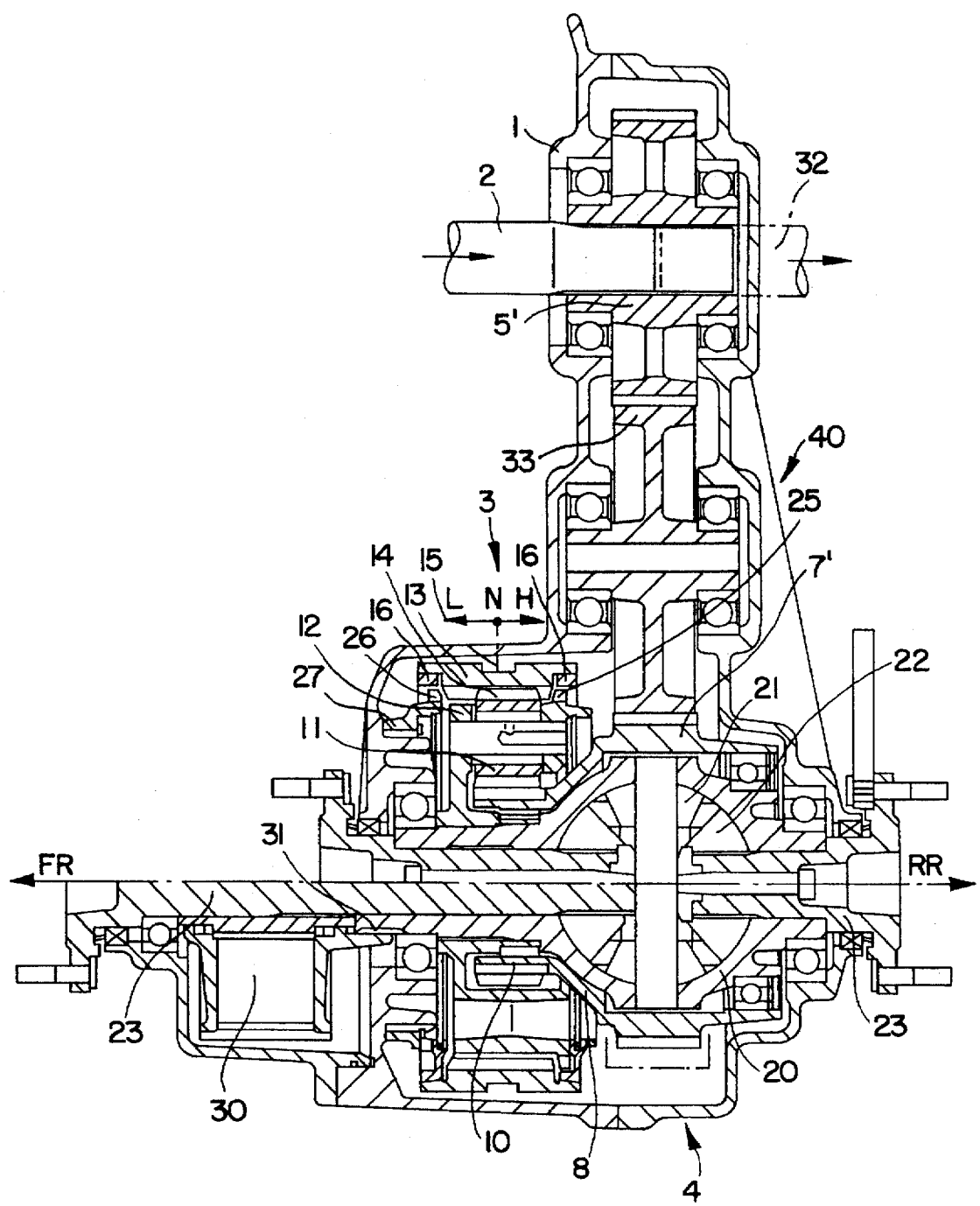
FIG. 2 is a view in vertical section of a second embodiment of a power transfer mechanism in accordance with the invention.

The second embodiment of the invention shown in FIG. 2 differs from the first embodiment only by a differently structured drive train 40. In this embodiment, the drive train 40 comprises a gear train consisting of a primary gear 5' mounted on the torque input shaft 2, an intermediate gear 33 journalled in the housing 1 and a secondary gear 7'.

Figure 3:
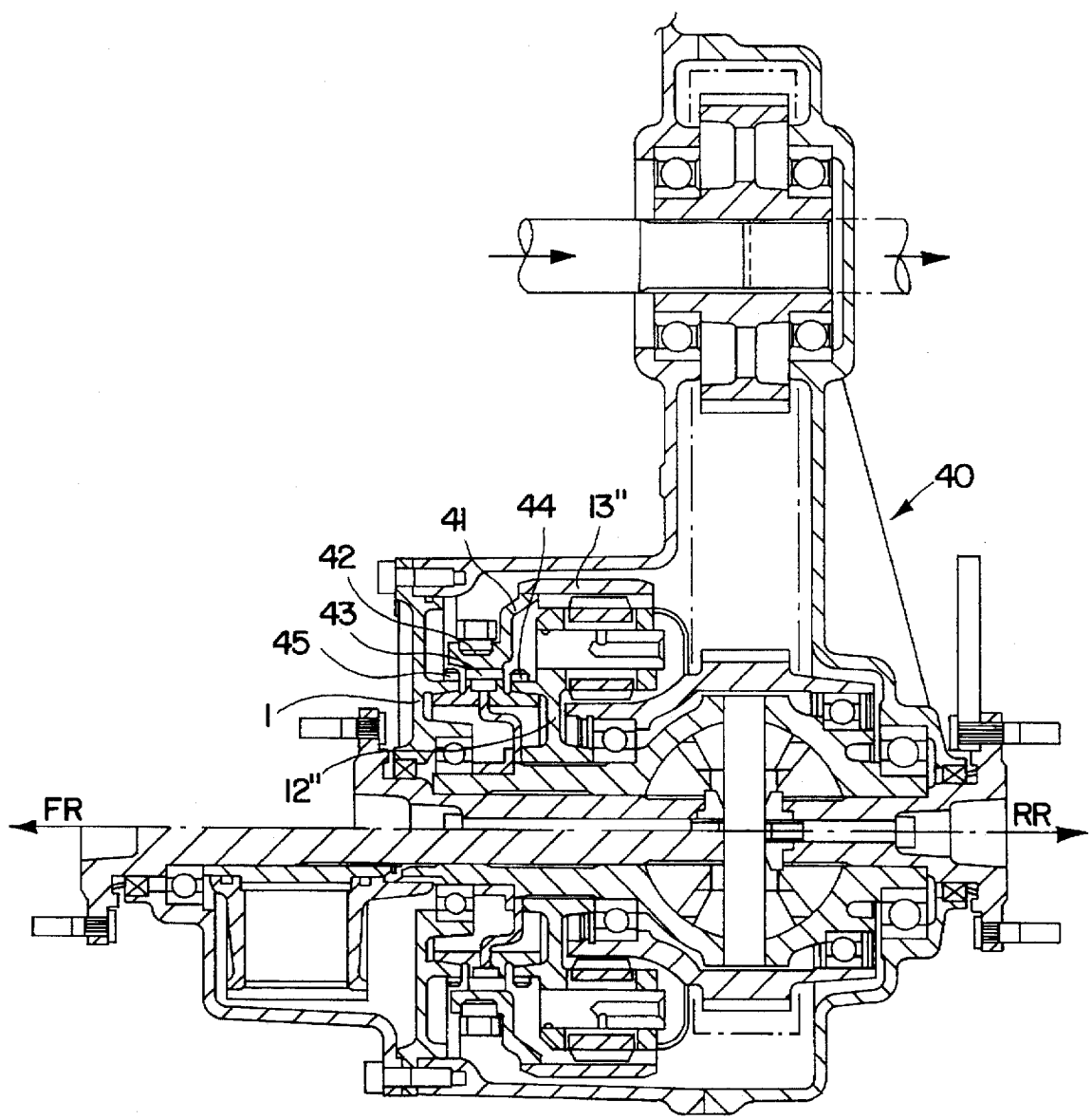
FIG. 3 is a view in vertical section of a third embodiment of a power transfer mechanism in accordance with the invention.

The third embodiment of the invention depicted in FIG. 3 of the drawings differs from the first embodiment by the arrangement of its dog teeth. In this embodiment, instead of dog teeth cooperating with the internal teeth of the ring gear 13", the ring gear 13" is rigidly connected to a bell shaped member 41 provided with internal teeth 43 and an annular groove 42 for receiving a shift fork (not shown). Depending on the axial position of the bell shaped member 41, its internal teeth 43 will selectively engage either a first set of dog teeth 44 of a planet carrier 12" or a second set of dog teeth 45 of the housing 1 or neither.

As will be appreciated by those skilled in the art, the apparatus in accordance with the invention offers numerous significant advantages over prior art apparatus, such as:

By arranging the planetary gear train at the lower or output end of the downwardly directed drive train, the load exerted on the drive train is significantly reduced. Consequently, only torque corresponding to that of the road gear setting need be transmitted, for the step-down transmission provided by the planetary gear train in its range gear mode does not take effect until later. The dimensions of the drive train may thus be smaller. This advantageously affects the dimensioning of the entire transmission system, especially where the drive train comprises a flexible traction element, a chain or a belt. Furthermore, lubrication of the planetary drive train is ensured without additional measures, regardless of the inclination of the vehicle and without any need for mounting the torque transfer box in a precisely vertical disposition.

The arrangement of the planetary gear train components yields the advantage that in its road gear setting the entire planetary gear train is rotating without incurring any losses. In the range gear setting, the large torque for driving the axles is taken from the planet carrier which is inherently sturdy in any event, and which is connected with the case of the differential by a short transmission path.

In a preferred embodiment of the invention the ring gear is axially moveable for selective connection with either the planet carrier or the housing. Shifting thus is made especially easy and the shift actuators require very little space.

Further simplification and cost savings are realized by the internal teeth of the ring gear meshing either directly with a first set of dog teeth provided on the planet carrier or with a second set of dog teeth mounted stationary relative to the housing, with the first and second sets being respectively positioned on opposite sides of the planet gears.

The advantage of a ring gear being moveable for selective connection with the planet carrier or the housing is that its teeth may also be utilized as a dog clutch, and because of its large diameter, the circumferential forces acting on the ring gear are relatively small. The corresponding dog teeth may, therefore, be structured very narrow, thus contributing to the compactness of the overall structure and to an advantageously short shift stroke. Furthermore, the ring gear is self centering as well and requires no bearing of its own.

The ring gear may be shifted in different ways. In a refined version, a shift fork provided for shifting the range transmission box directly engages the ring gear. Hence, the ring gear serves as a dog clutch at the same time, thus saving additional components and space. Since shifting between range and road gear settings is undertaken at low speeds, the circumferential speed at the relatively large ring gear poses no problems; in point of fact, it is of advantage for incorporating synchronizing devices.

A further reduction in the mounting space, and strengthening of the components affected in the range gear setting, are achieved by the sun gear and the secondary wheel powered by the drive train constituting a hollow shaft surrounding the differential case, with the secondary wheel being arranged essentially in the plane of symmetry of the case. This results in a reduced structural length. Where the drive train utilizes a traction element, the secondary wheel, for preserving the traction element and for reasons relating to the transmission, will at any rate be of a sufficiently large diameter.

The torque transfer case in accordance with the invention may be equipped with any desired complete or partial locking means. Such means may be mounted at the side of the differential opposite the planetary gear train or at the same side. A fluid friction or viscous coupling may advantageously be mounted such that one of the propeller shafts is circumscribed by it and drives internal components thereof, and that its external components are drivingly connected with the cage of the differential or with the planet carrier.

Finally, as the side of the housing opposite the engine is free in view of the range transmission box being mounted on the same level as the propeller shafts, the invention permits connecting a power take-off to the end of the torque input shaft opposite the engine.

It can thus be seen that the invention provides a torque transfer case offering distinct advantages over hitherto known apparatus.

It will be understood by persons skilled in the art that certain changes and modifications may be made in any of the embodiments herein described, without departing from the scope or spirit of the invention. It is, therefore, intended that all matter herein described is to be interpreted as being exemplary only, and in no way as limiting the scope of protection sought.

What is claimed is:

1. A power transfer apparatus for operating an automotive vehicle in a road gear mode and a range gear mode, comprising:

means defining a housing;

a torque input shaft rotatably mounted in said housing in a first plane thereof and comprising means for transmitting torque;

differential gear means including differential case means and a pair of propeller shafts drivingly connected thereto and extending coaxially from opposite sides of said differential gear means substantially parallel to said torque input shaft;

range transmission box means mounted in a second plane below said first plane and comprising a planetary gear train including planet carrier means drivingly connected to said differential case means, internally toothed ring gear means, planetary gear means meshing with said ring gear means, and sun wheel means;

drive train means drivingly connecting said torque transmitting means with said sun wheel means;

and means selectively coupling said ring gear means with one of said planet carrier corresponding to said road gear mode and said housing corresponding to said range gear mode.

2. The apparatus of claim 1, wherein said ring gear means is mounted for axial movement from a neutral position for selective coupling with said planet carrier means and said housing.

3. The apparatus of claim 2, wherein said planet carrier means and said housing are provided with dog tooth means positioned on opposite sides of said ring gear means for selective engagement with the internal teeth thereof.

4. The apparatus of claim 3, wherein said dog teeth and said ring gear means are provided with synchronizing means.

5. The apparatus of claim 2, wherein said ring gear means comprises an circumferential groove in its outer periphery adapted for engagement with a shift fork.

6. The apparatus of claim 1, wherein said sun gear means is provided on sleeve means rotatably surrounding said differential case means and supporting, substantially in a symmetrical plane of said differential gear means, wheel means drivingly connected to said drive train means.

7. The apparatus of claim 6, wherein said torque transmitting means comprises primary pulley means and said wheel means comprises secondary pulley means, said primary and secondary pulley means being connected by belt means.

8. The apparatus of claim 6, wherein said torque transmitting means comprises primary sprocket means and said wheel means comprises secondary sprocket means, said primary and secondary sprocket means being connected by chain means.

9. The apparatus of claim 6, wherein said torque transmitting means comprises primary gear means and said wheel means comprises secondary gear means, said primary and secondary gear means being connected by intermediate gear means.

10. The apparatus of claim 1, wherein at least one of said propeller shafts is provided with torque responsive viscous coupling means comprising internal components driven by said propeller shaft and external components drivingly connected to one of said differential case and said planet carrier.

11. The apparatus of claim 1, wherein said torque input shaft is further provided with take-off power means.

12. A power transfer apparatus for operating an automotive vehicle in a road gear mode and a range gear mode, comprising:

means defining a housing;

a torque input shaft rotatably mounted in said housing in a first plane;

differential gear means positioned in a plane below said first plane;

first and second coaxial propeller shafts drivingly connected to opposite sides of said differential gear means substantially parallel to said torque input shaft;

range transmission box means comprising planetary gear train means mounted substantially coaxially with said differential gear means;

drive train means for transferring torque from said torque input shaft to said planetary gear train means; and means for selectively coupling said planetary gear train means with said differential gear means at first and second transmission ratios, respectively corresponding to said road gear mode and said range gear model;

said planetary gear train means comprising sun wheel means drivingly connected to said drive train means, planet carrier means connected to said differential gear means, internally toothed ring gear means selectively movable into engagement with said planet carrier means and said housing means, and planet gear means meshing with said ring gear means.

13. The apparatus of claim 12, wherein said planet carrier means and said housing are provided with dog teeth laterally aligned with the internal teeth of said ring gear means on opposite sides thereof and wherein said ring gear means is mounted for selective movement relative to said dog teeth.

* * * * *